United States Patent [19]

Fischer et al.

[11] Patent Number: 4,773,808

[45] Date of Patent: Sep. 27, 1988

[54] EMPTYING DEVICE FOR SILOS WITH TELESCOPIC FALL PIPE ARRANGED IN THE SILOS

[75] Inventors: Gerhard Fischer, Dortmund-Kirchhörde; Günter Ströcker, Holzwickede Kr.Unna, both of Fed. Rep. of Germany

[73] Assignee: Gustav Schade Maschinenfabrik GmbH & Co., Dortmund, Fed. Rep. of Germany

[21] Appl. No.: 15,715

[22] Filed: Feb. 17, 1987

[30] Foreign Application Priority Data

Feb. 28, 1986 [DE] Fed. Rep. of Germany ....... 3606668

[51] Int. Cl.⁴ ...................... A01F 25/20; B65G 65/42
[52] U.S. Cl. ..................................... 414/317; 414/302
[58] Field of Search ............................ 414/313–317, 414/299–302, 304, 305; 193/15, 30

[56] References Cited

U.S. PATENT DOCUMENTS

| | | | |
|---|---|---|---|
| 34,379 | 2/1862 | Strong | 193/30 X |
| 679,875 | 8/1901 | Blaisdell | 414/313 X |
| 772,911 | 10/1904 | Acklin | 414/317 |
| 1,331,020 | 2/1920 | MacLennan | 193/30 X |
| 1,479,990 | 1/1924 | Keys | 414/313 X |
| 2,500,043 | 3/1950 | Radtke | 414/317 X |
| 2,649,215 | 8/1953 | Dickson | 414/317 X |
| 3,513,995 | 5/1970 | Ströker | 414/317 |
| 3,526,328 | 9/1970 | Garrett et al. | 414/302 X |
| 4,225,033 | 9/1980 | Fukagi et al. | 414/299 X |
| 4,284,369 | 8/1981 | Gsponer et al. | 414/313 X |
| 4,350,467 | 9/1982 | Soros | 414/313 |

FOREIGN PATENT DOCUMENTS

| | | | |
|---|---|---|---|
| 254778 | 9/1966 | Austria | 414/313 |
| 831519 | 1/1952 | Fed. Rep. of Germany | |
| 1250360 | 9/1967 | Fed. Rep. of Germany | |
| 11477 | 1/1980 | Japan | 193/30 |

Primary Examiner—Robert J. Spar
Assistant Examiner—David A. Bucci
Attorney, Agent, or Firm—Body, Vickers & Daniels

[57] ABSTRACT

In the device according to the invention for emptying bulk material from silos (1), a telescopic fall pipe (24) is used as a delivery shaft for the bulk material to be emptied, which telescopic fall pipe (24) has at least one sliding pipe (27) which is arranged between an upper coupling pipe (25), arranged with the clearing device (4) which can be lifted, and a lower stand pipe (30) or bellows. In order to prevent the sliding pipe (27) from falling down or suddenly slipping through, a fall-prevention feature in the form of a retaining or automatic-retraction device or the like is allocated to the sliding pipe (27), which retaining or automatic-retraction device preferably consists of hydraulic lifting cylinders (36) which control the lifting movements of the sliding pipe. The telescopic fall pipe (24) expediently has only a few pipe sections, preferably only a single sliding pipe (27).

32 Claims, 5 Drawing Sheets

EMPTYING DEVICE FOR SILOS WITH TELESCOPIC FALL PIPE ARRANGED IN THE SILOS

BACKGROUND OF THE INVENTION

1. Field of the Invention

The invention relates to a device for emptying bulk material from silos, having a clearing device which removes the bulk material on the upper surface of the bulk material heap, can be lifted and lowered in the silo and feeds the bulk material to a telescopic fall pipe which extends vertically through the silo and is coupled to the clearing device such that it follows the lifting movements of the clearing device by telescope-like retraction and extension, with the telescopic fall pipe having an upper coupling pipe with a bulk material inlet and coupled to the clearing device, and at least one sliding pipe adjoining the inlet downwards towards the silo base.

2. Description of the Related Art

In small silos, which are used for accommodating silage, it is known to provide as a delivery shaft for the stored material a self-supporting telescopic fall pipe which is arranged centrally in the silo, the upper pipe of which bears a clearing arm, pivotable about the silo axis, and is provided with an inlet for the stored material conveyed by the clearing arm (German Auglegeschrift No. 1,250,360). At the same time, the upper pipe forms a coupling pipe with which the retracted telescopic fall pipe, together with the clearing unit, is pulled back upwards in the silo by means of a winch rope.

In another known silo-emptying device which is intended for isolated small silos for accommodating lumps of ice, a telescopic fall pipe is also used as the delivery shaft, which telescopic fall pipe, however, in this device, leads with its individual pipes to an internal, fixed stand pipe (German Patent Specification No. 831,519). As a result of the stand pipe, the conveying cross-section of the telescopic fall pipe is narrowed and at the same time the expense of construction is increased.

The known silos having a central delivery shaft designed as a telescopic fall pipe have not been able to become established in practice for bulk material silos of larger storage capacities. A difficult problem with these devices is that the telescopic movements of the telescopic fall pipe standing in the stored material cannot be reliably controlled in use. When the clearing unit is lowered in the silo, the telescopic fall pipe is certainly forced to retract, but at the same time it is unable to reliably retract gradually section by section from the bottom upwards. On the contrary, the individual pipes of the telescopic column or even entire groups of pipes of the same can prematurely retract in an uncontrolled manner before the pipes lying underneath are retracted. The consequence of this is that the pipes or pipe groups which have been prematurely retracted, as soon as the adhesive force at the surrounding bulk material is overcome, fall down suddenly in the telescopic column under their own weight before they hit the flange of the pipe section lying underneath. This uncontrolled falling of individual pipes or even entire pipe groups, with the considerable weight of the same, leads to exceptionally high shock loads and, as a consequence thereof, to severe vibration and serious damage to the entire installation. Repairing the telescopic fall pipe standing in the stored material is exceptionally laborious and time-consuming.

Of course, the abovementioned problems occur to a considerable extent if bulk materials which are not reliably free-flowing are stored in the silo, for example such bulk materials as gypsum, saline manure or other salts, and bulk materials comparable in behaviour, which tend to stick, compact or even harden. No bulk-material clearing and discharge devices are as yet available which are absolutely reliable for the storage of such difficult bulk materials in large silos.

SUMMARY OF THE INVENTION

The invention falls back on the proposals, which are well known but have not as yet gained acceptance in practice for storing bulk material, to use a telescopic fall pipe as a delivery shaft for the bulk material to be emptied, which telescopic fall pipe is loaded from above with bulk material by the clearing device working in the silo and conveys the stored material away downwards through the silo base. The object of the invention is principally to design a silo-emptying device of the said type, which is preferably intended for emptying difficult bulk materials of the abovementioned type from silos of large storage capacities, in such a way that sudden falling of individual pipes or pipe groups of the telescopic fall pipe and the risk connected herewith for the durability of the installation are reliably prevented, and at the same time to advantageously achieve this in a simplified embodiment of the clearing device or its telescopic fall pipe.

The set object is achieved according to the invention by a fall-prevention feature allocated to the sliding pipe and in the form of a retaining or automaticretraction device.

The invention is accordingly based on a telescopic fall pipe which has at least one sliding pipe which is indeterminate in its retraction sequence inside the telescopic column and therefore possibly retracts and extends in an uncontrolled manner and which is connected between the coupling pipe, coupled to the clearing device and therefore carried along by the latter both upwards and downwards, and the silo base or a stand pipe arranged here in fixed manner above a delivery conveyor; moreover, the invention makes provision for allocating a fallprevention feature to the sliding pipe which is "floating" in the bulk material heap with indeterminate adhesion to the bulk material, which fall-prevention feature prevents the sliding pipe from falling down by the length of the section as soon as its dead weight exceeds the adhesive force of the bulk material mass. This fall-prevention feature consists of either a retaining device or an automatic-retraction device which retains the sliding pipe in its extended position and which controls the retraction of the sliding pipe during the course of the lifting movements of the clearing device and the telescopic movements of the telescopic pipe in such a way that the heavy sliding pipe cannot fall down unintentionally. Thus the bulk-material emptying device acording to the invention can be used in operationally reliable manner even in silos of large storage capacities and in bulk materials which tend to stick, compact or harden. A stand pipe arranged in the telescopic fall pipe can be dispensed with in favour of a self-supporting telescopic fall pipe.

The retaining or automatic-retraction devices can be embodied in various ways. In a simple embodiment, a shock-absorbing device damping the downwards movement of the sliding pipe can be used as a retaining device, which shock-absorbing device can expediently consist of several shock absorbers, for example hydraulic or hydropneumatic shock absorbers of known type, which are in distributed over the periphery of the sliding pipe. Instead, the retaining device can also be formed by a braking device, for example a rope brake or the like, which has a braking action on the sliding pipe, or for example by at least one counterbalance weight acting in the extension direction of the sliding pipe. All of these embodiments of the retaining device prevent the sliding pipe from suddenly slipping through by either damping these uncontrolled downwards movements as passively acting damping devices or holding the sliding pipe in its raised position until, after the coupling pipe above it has retracted, it is loaded by the weight of the lowering clearing device and is thereby slowly pressed downwards with the downwards movement of the clearing device, as is the case with the rope tackle weight or the like acting in the extension direction of the sliding pipe.

However, in a preferred embodiment of the invention, the said automatic-retraction device is formed by a lifting drive or the like which is connected to the sliding pipe and with which the lifting movement of the sliding pipe, at least in the retraction direction, but also preferably in the extension direction, can be actively controlled, if possible in a manner which, during the lowering of the clearing device in the silo, results in a predetermined retraction sequence of the pipes of the telescopic pipe and expediently also, during the upwards movement of the clearing device, in a predetermined extension sequence of the pipes of the telescopic section. Lifting units which can be retracted and extended linearly, such as, in particular, pressurized lifting cylinders or conventional positioning units having a spindle drive, are preferably used—for the lifting drive, although lifting drives—consisting of chain or rope drives—rack-and-pinion drives and lantern-gear drives and the like are also possible.

The telescopic fall pipe can of course also have several sliding pipes inserted between the end pipes. In order on the one hand to simplify the construction of the telescopic fall pipe and on the other hand to increase its functional reliability during the working movements, it is advisable to use a telescopic fall pipe having as few telescopic sections or telescopic stages as possible. According to the invention, a telescopic pipe is advantageously used which consists of a maximum of four telescopic sections having two sliding pipes, in which case a retaining or automatic-retraction device of the said type can be allocated to each individual sliding pipe. However, in a preferred embodiment of the invention, a telescopic fall pipe is provided with only a single sliding pipe. In this case, the telescopic fall pipe is made in three pieces; it comprises the coupling pipe coupled to the clearing device which can be lifted, the sliding pipe which adjoins the coupling pipe at the bottom and passes through a base opening in the silo base, and a stand pipe or the like which is arranged beneath the silo base and can also be formed by bellows which are connected to the lower end of the sliding pipe. Because of the small number of telescopic stages, this preferred embodiment of the invention leads to a considerable simplification in construction and also to an increase in the functional reliability during the working movements of the telescopic parts, especially as only a single sliding pipe is available, to which is allocated as a fall-prevention feature the retaining or automatic-retraction device. Moreover, the retaining or automaticretraction device may be located in a protected and spatially favourable manner beneath the silo base whereby the telescopic fall pipe above the base is free from mounted parts which are difficult to access.

In order to obtain on the one hand sufficient clearance height beneath the silo base for lowering the telescopic pipe and accommodating the required devices and on the other hand to keep within limits a loss in storage space in the event that the silo base is put up, it is advisable to arrange the silo base such that it slopes outward from the central base opening used in the passage of the telescopic fall pipe. In this connection, the sliding pipe is expediently guided in the central base opening while being sealed. The clearing device has at least one clearing arm, preferably in the configuration of a scraper, which can be adjusted to the slope of the silo base and is pivotable about the silo axis. The clearing arm can be mounted so as to be vertically pivotable on a driven rotary member to which the coupling pipe of the telescopic fall pipe can also be connected and which is mounted on a lifting frame or the like which is guided at its ends on vertical guides on the silo wall. In such a development of the emptying device, the reaction forces of the clearing unit are dissipated on the silo wall—over the shortest path via the liftingframe. At the same time, the telescopic fall pipe is also reliably supported and guided at its upper end.

If the sliding pipe according to the preferred embodiment of the invention is controlled in its lifting movements by means of a lifting drive, preferably a cylinder drive, it is advisable to provide a control device which controls the working movements of the sliding pipe as a function of the lifting movements of the clearing device. Such control devices are known.

Finally, the invention comprises a method of controlling the lifting movements of a telescopic fall pipe, the upper pipe part of which consists of a coupling pipe which is connected to the clearing device and which engages as a telescoping pipe into a lower sliding pipe. According to the inventive method, the lifting movements are controlled in such a way that, during the lowering movement of the clearing device from the raised position, the coupling pipe first of all retracts relative to the sliding pipe automatically held in the raised position, with both pipes being lowered together only after the coupling pipe has fully retracted into the sliding pipe; conversely, during the upwards movement of the clearing device from the lowered position at the silo base, the retracted sliding and coupling pipes, in interaction with the lifting mechanism acting from above, are first of all raised together with a lifting force acting from below on the sliding pipe or sliding pipes, with the coupling pipe only being extended out of the sliding pipe or sliding pipes after the latter have been fully lifted. These working movements of the telescopic pipe both up and down, in particular when hydraulic thrust-piston mechanisms are used, can be controlled in a simple and reliable manner as lifting devices for the sliding pipe.

Further features of the invention are specified in the individual claims.

BRIEF DESCRIPTION OF THE DRAWINGS

The invention is described in greater detail below in conjunction with the exemplary embodiments shown in the drawing, in which.

DESCRIPTION OF THE PREFERRED EMBODIMENT

Figure 1:
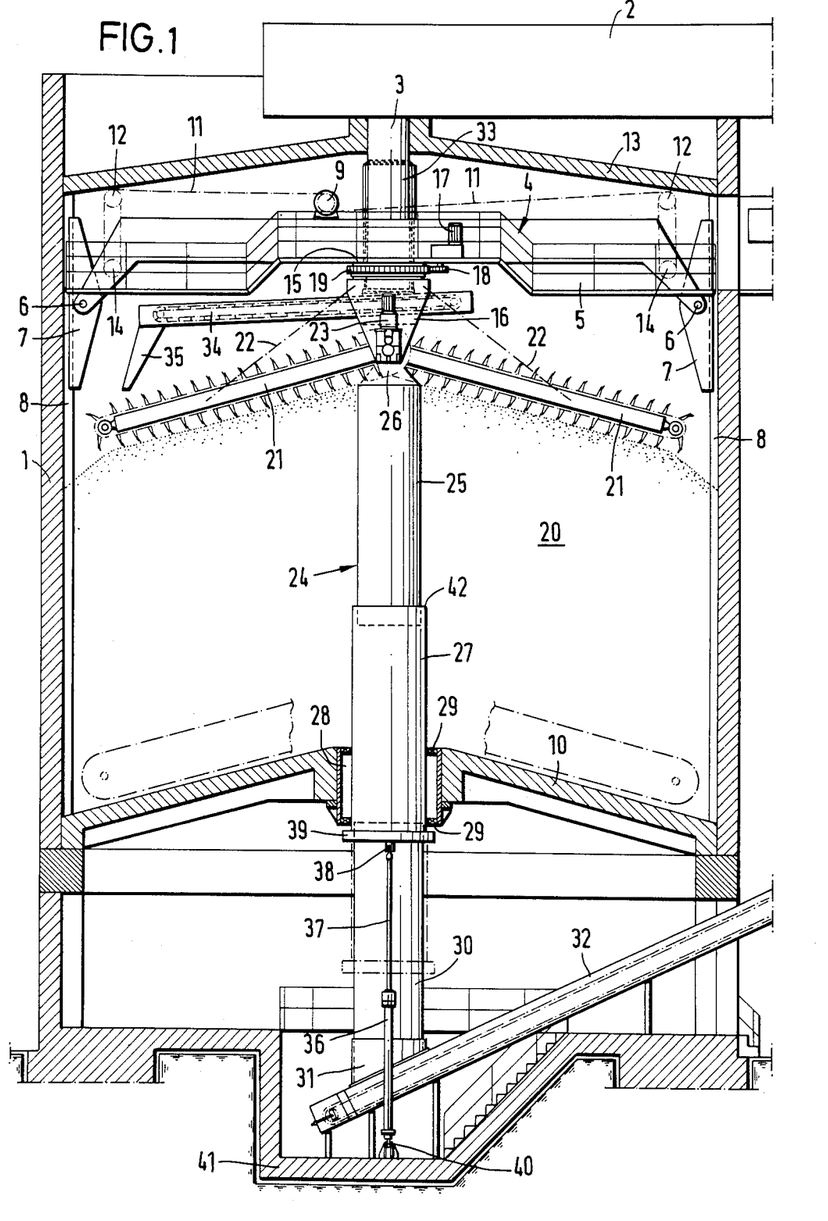
FIG. 1 shows, in a vertical section through a silo, a bulk-material emtpying device according to the invention in a preferred development of the invention.
Figure 2:
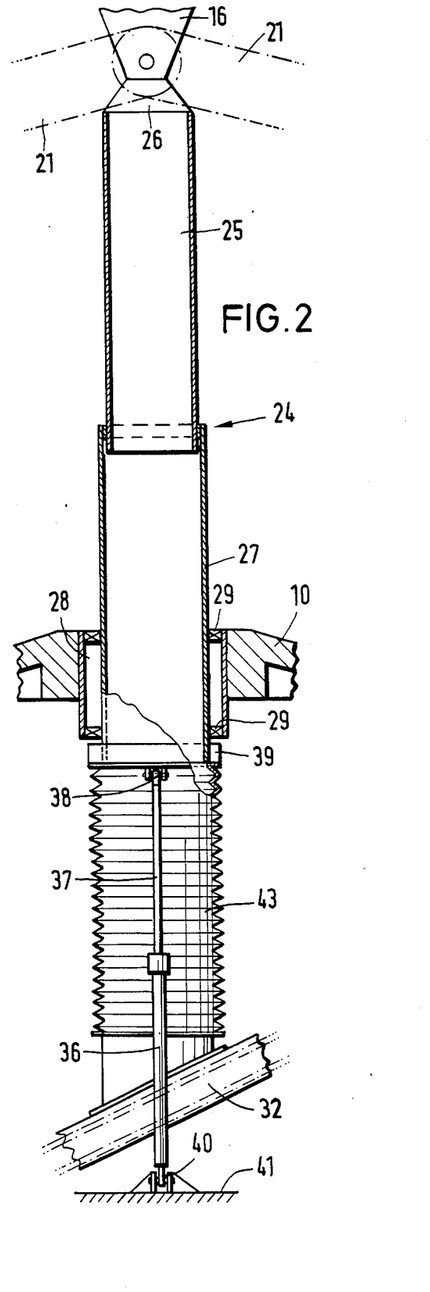
FIGS. 2, 3, 4, 5, 6, 7 and 8 each show further developments of retaining or automatic-retraction devices according to the invention in vertical section through a telescopic fall pipe which can be used in the silo according to FIG. 1 and the clearing device provided here, in FIG. 5 a cross-section being shown along line V—V in FIG. 4.

In the drawing, 1 designates a round silo which is intended as a large silo for the storage of bulk materials of different types, in particular such bulk materials as above all gypsum, saline manure or other salts which tend to compact, stick or even harden. A loading device 2 (not shown in greater detail) is arranged in the upper area of the silo for loading the silo 1 with the bulk-material to be stored, which loading device 2 has, for example, a storing conveyor which discharges centrally into the silo 1 at 3 the bulk material to be stored.

In its main parts, the clearing device 4, which can be lifted and lowered in the silo, consists of a lifting frame 5 which is made as a bridge girder extending transversely through the silo or as a girder which is roughly cross-shaped or star-shaped in plan view and which bears sliding shoes 7 which are attached to its ends in articulations 6 and with which the entire clearing device is supported and guided in rotationally locked manner on vertical guides 8 of the cylindrical silo wall. A lifting mechanism 9 is arranged on the lifting frame 5, with which lifting mechanisms 9 the entire clearing device 4 can be lowered in the silo 1 down to the silo base 10 and can be lifted from the lowered position back into the raised position shown. The lifting mechanism 9 expediently consists of at least one rope winch, the winch ropes 11 of which are guided over guide pulleys 12 on the ceiling 13 of the silo and guide pulleys 14 of the lifting frame 5.

A rotary member 16 is mounted centrally on the underside of the lifting frame 5 via a rotary connection or a slewing ring 15. The rotary drive 17 is located on the lifting frame 5; it has a driven pinion 18 which meshes with a toothed ring 19 of the rotary member 16, which can thus be rotated about the vertical axis of the silo 1. The clearing unit working on the upper surface of the bulk material heap 20 is mounted on the rotary member 16, which clearing unit, in the preferred exemplary embodiment, consists of two clearing arms 21 in the form of scrapers which, at their inner ends, are mounted on the rotary member 16 in articulations (not shown) so as to be vertically pivotable to a limited extent, with it being possible for the vertical adjustment to be effected, for example, by means of a winch rope 22. One of the two drives of the clearing arms 21 is designated as 23. The scraper chain drive of the other clearing arm is concealed behind the drive 23.

Moreover, a telescopic fall pipe 24 standing in the vertical centre axis of the silo 1 is connected with its upper end to the rotary member 16, so that it is carried along by the lifting frame 5 in the up and down direction during the lifting movements or is able to follow the lifting movements by retracting and extending in the manner of a telescope. In the shown preferred exemplary embodiment of the invention, the telescopic fall pipe 24 is made of three pieces. In this connection, it consists of an upper coupling pipe 25 which, at its upper end, is connected to the rotary member 16 in a manner resistant to compression and tension and in addition forms at its upper open end the bulk material inlet 26, and moreover a sliding pipe 27 adjoining the pipe 25 at the bottom, which sliding pipe 27 passes through a central base opening 28 at the silo base 10 and at the same time is expediently guided in the base opening 28 and is sealed by means of encircling seals 29, and finally a stand pipe 30 which is arranged in a fixed position beneath the silo base 10 and which, with its lower discharge end 31, lies above a rising delivery conveyor 32 which is formed, for example, by a chain scraper conveyor. The coupling pipe 25 can be pushed as a telescopic pipe into the sliding pipe 27 of larger diameter. In the exemplary embodiment according to FIG. 1, the sliding pipe 27 has the largest diameter and the coupling pipe 25 the smallest diameter, so that the stand pipe 30 can also be pushed into the sliding pipe 27 and in addition the coupling pipe 25 can be pushed into the lower stand pipe 30. In FIG. 1, the lower position of the sliding pipe 27 is indicated in chain-dotted lines. In this position, the clearing arms 21 are located in the lower working position, also indicated in chain-dotted lines, at the silo base 10, which slopes outwards from the base opening 28 in order to obtain as large a storage volume as possible in the silo with adequate clearance height beneath the silo base.

The bulk material to be stored is discharged centrally from above into the silo via the loading device 2. It falls through a telescope-like storing pipe 33 which is arranged between the lifting frame 5 and the discharge point 3, is able, on account of its telescopic movements, to follow the lifting movements of the clearing device 4 and feeds the bulk material to a distribution belt 34 or the like which is arranged on the rotary member 16, rotates with the rotary member about the silo axis and at the same time discharges the fed bulk material into the silo via a chute 35. The fed bulk material can be distributed over the silo cross-section by means of the scraper chain belt of the scraper 21.

During the emptying operation, the entire clearing device slowly lowers in the silo 10, which is effected by means of the lifting mechanism 9. The clearing arms 21 rotate with the rotary member 16 about the silo axis; they convey inwards the bulk material on the upper side of the bulk material heap 20 and, at their inner ends, throw it into the inlet opening 26 of the coupling pipe 25, which can rotate with the rotary member 16 or else is connected via a rotary connection, for example a verticle swivel pin, to the rotary member 16 such that it does not participate in the rotary movement of the latter. The bulk material discharged from above into the telescopic fall pipe 24 falls downwards in the telescopic fall pipe and can be carried away here via the rising delivery conveyor 32.

Allocated to the sliding pipe 27 lying between the pipes 25 and 30 in the telescopic column is a retaining or automatic-retraction device which, during the telescopelike retraction of the fall pipe 24, prevents a condition from occurring in which the sliding pipe 27 can fall freely downwards as soon as its dead weight exceeds the adhesive force with which the sliding pipe is held in the surrounding stored material. The retraction sequence of the various pipes of the telescopic fall pipe 24 can be determined or controlled by means of the retaining or automaticretraction device.

In the preferred exemplary embodiment shown, an automatic-retraction device is provided for prventing the sliding pipe from falling down, which automaticretraction device has at least one and preferably two hydraulic lifting cylinders 36 which are arranged on diametrically opposite sides of the stand pipe 30 and which, with their piston rods 37 in articulations 38, engage on an outer extension or flange 39 on the lower end of the sliding pipe 27 and, with their lower cylinder parts in articulations 40, are supported on the floor 41. The cylinders 36 are preferably designed as double-acting thrust-piston mechanism which can be alternately charged with the pressure medium on one side or the other. Thus the sliding pipe 27 can be moved by means of the lifting cylinders 36 from raised position, shown in solid lines, into the lowered position, shown in chain-dotted lines, and vice versa, with its being possible to control the movement of the sliding pipe 27 as a function of the lifting movements of the clearing device 4.

FIG. 1 shows the clearing device 4 near to its raised position, in which the telescopic fall pipe 24 has essentially been fully extended in the manner of a telescope. During the lowering movement of the clearing device 4 from the raised position, the sliding pipe 27 is first of all held by the extended lifting cylinders 36 in its extended position shown, so that the coupling pipe 25 coupled to the clearing device 4 pushes into the sliding pipe 27. Only when the coupling pipe 25 has essentially been pushed fully into the sliding pipe 27 during the further progress of the emptying work are both pipes 25 and 27 lowered together in synchronism with the lowering movement of the clearing device 4, which is effected by corresponding control of the lifting cylinders 36 in the retraction direction. The lifting cylinders 36 can be actively retracted during the lowering movement of the two pipes 25 and 27. However, the arrangement can also be made such that the pipes 25 and 27 are lowered by the superimposing weight of the clearing device 4 against the resistance of the lifting cylinders 36, the fluid discharge of which from the cylinder space is appropriately controlled.

The abovementioned retraction sequence of the pipes 25 and 27 during the emptying work has the advantage that the lower lying sliding pipe 27 does not have to execute any working movements over the longitudinal area of the upper coupling pipe 25 and that above all the upper end face 42 of the sliding pipe 27, at every bulk material level, always lies near to the upper surface of the bulk material heap 20 on which the clearing units 21 work. Thus the sliding pipe 27, during the upwards movement, does not have to be pressed with its end face 42 through the superimposing, more or less compacted or hardened bulk material.

During the upwards movement of the clearing device 4 from the lowered position in the area of the silo base 10 into the raised position shown, both pipes 25 and 27 are first of all raised in the retracted condition relative to the stand pipe 30, which is effected by means of the lifting mechanism 9 in interaction with the controlled lifting cylinders 36. As soon as the sliding pipe 27 has reached its extended position, the coupling pipe 25, which is carried along by the upwardly moving clearing device 4, is extended out of the sliding pipe 27, which at the same time is held in its extended position by the lifting cylinders 36 and is therefore protected from falling.

Instead of the extension cylinders 36, it is also possible to provide a shock-absorbing device which dampens the downwards movement of the sliding pipe 27 and has one or preferably several shock-absorbers which, just like the cylinders 36, are supported on the floor 41 and engage on the lower end of the sliding pipe 27. Such hydraulic or hydropneumatic shock absorbers are known in technology. In this case, the shock absorbers only bring about a passive damping of the downward movement of the sliding pipe 27, so that the possibility of this sliding pipe suddenly slipping through during operation is eliminated. In this case, sliding pipe 27 is pushed in against the action of the shock absorbers when, on the adhesive force of the surrounding bulk material being overcome, the sliding pipe lowers under its own dead weight or when the sliding pipe is pressed downwards by the lowering clearing device 4 after the coupling pipe has been pushed in. During the upwards movement of the clearing device 4, the coupling pipe 25 carried along by the clearing device 4 is first of all extended, which coupling pipe 25, at full extension, runs with its outer end flange against an inner flange on the upper end of the sliding pipe 27 and thus carries along the sliding pipe during the further upwards movement of the clearing device. The use of such flanged pipes for telescopic pipes is common practice.

FIGS. 2 to 8 show some embodiment variants from the preferred exemplary embodiment according to FIG. 1. In the embodiment according to FIG. 2, the lower stand pipe 30 is replaced by bellows 43 which are connected to the lower end of the sliding pipe 27 and thus form the pipe connection, variable in length, between the sliding pipe and the delivery conveyor 32. Otherwise, this device corresponds to that according to FIG. 1.

Figure 3:
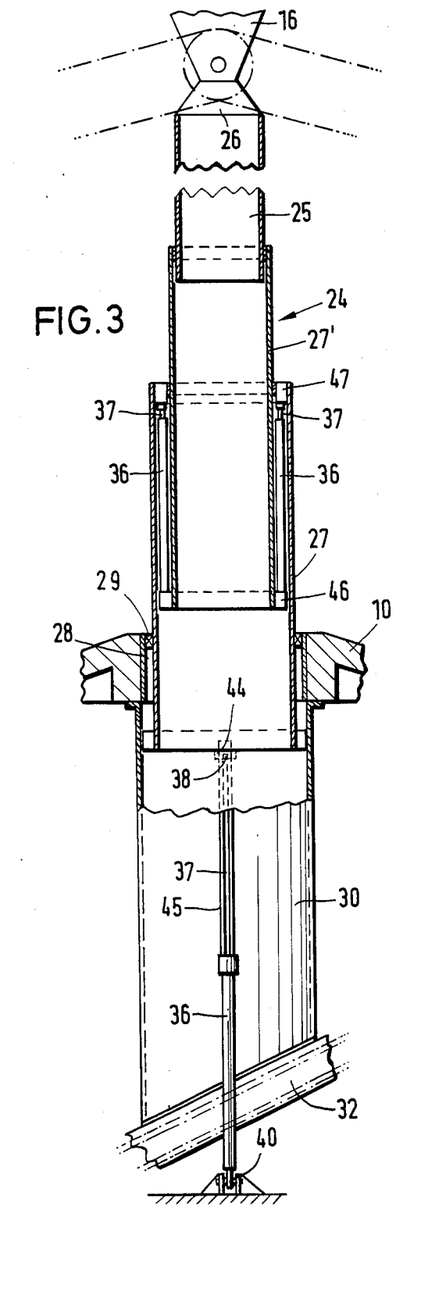

Whereas in FIG. 1 the sliding pipe 27 pushes over the stand pipe 30, according to FIG. 3 a stand pipe 30 can be provided whose diameter is larger than that of the sliding pipe 27 so that the sliding pipe can push into the stand pipe 30. In this arrangement, it is advisable to join the external lifting cylinders 36 (or the shock absorbers used instead of them) in the piston-rod articulations 39 to brackets or other radial extensions 44 on the lower end of the sliding pipe 27 which passes through axial slots 45 in the stand pipe 30.

In addition, FIG. 3 shows an embodiment in which two sliding pipes 27 and 27' which can be pushed into one another in the manner of a telescope are provided betwen the end pipes 25 and 30. In this case, a retaining or automatic-retraction device of the said type, preferably in the form of the abovementioned pressurized lifting cylinders 36, is allocated to each of the two sliding pipes 27 and 27'. The pressure-medium cylinders 36 allocated to the upper sliding pipe 27' lie between the pipes 27 and 27'; they are supported on a flange 46 at the lower end of the sliding pipe 27' and engage with their piston rods 37 in articulations on a flange 47 at the upper end of the sliding pipe 27. This likewise can prevent the sliding pipes from falling down and can preferably also control retraction and extension of various pipes when the telescopic fall pipe 24 is being retracted. The pipes are preferably controlled here in such a way that, during the lowering movement of the clearing device 4, the coupling pipe 25 first of all pushes into the upper sliding pipe 27', then the upper sliding pipe 27', together with the retracted coupling pipe 25, pushed into the lower sliding pipe 27 and then all of the retracted pipes 25, 27' and 27 are retracted together into the stand pipe 30. The extension movement correspondingly executed in the reverse sequence, with first of all the three pipes 25, 27' and 27 being extended together until the pipe 27 is fully lifted and only then the two pipes 25 and 27' being extended out of the pipe 27, held against lowering, before the upper pipe 25 extends out of the upper sliding pipe 27', which in this connection is held in its extended position via the lifting cylinders 36.

Figures 4, 5:
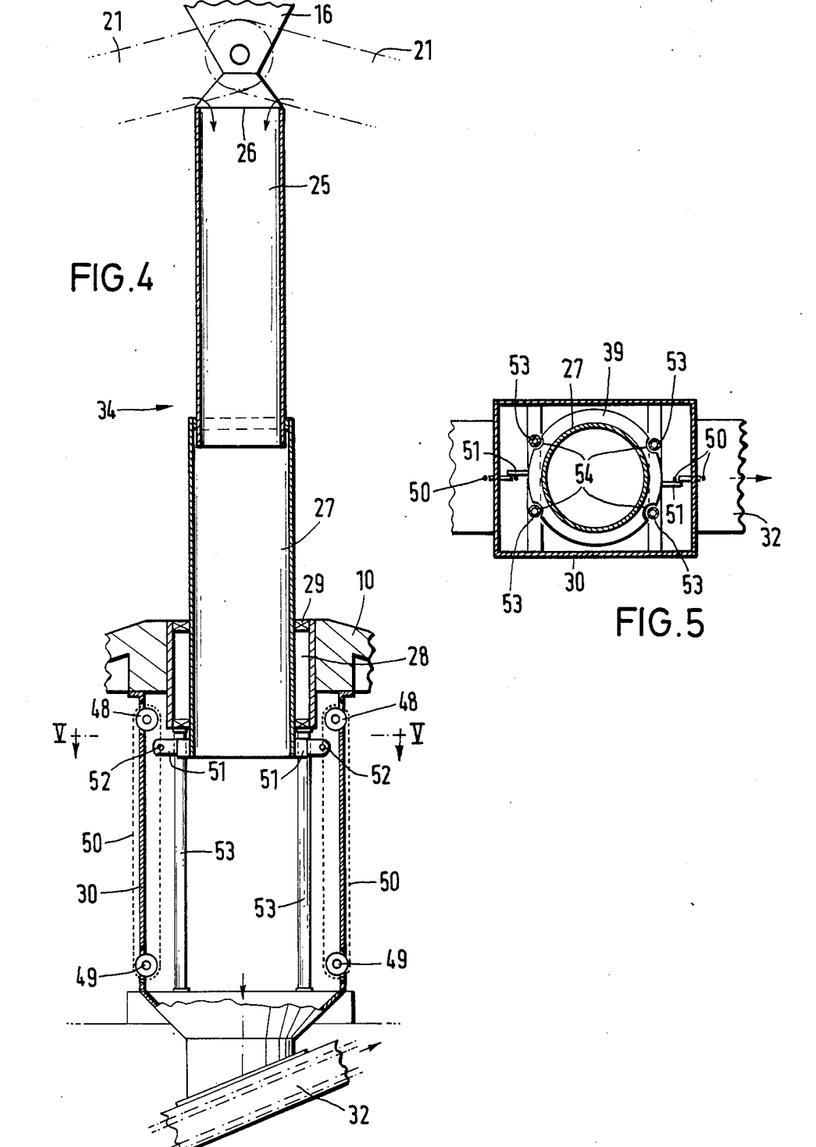

Instead of the lifting cylinders 36 preferably provided, other positioning motors which can be extended or shortened linearly, for example conventional positioning units with driven spindles, or even lifting drives or shock-absorbing devices of another type can also be provided. FIGS. 4 and 5 show an exemplary embodiment in which a chain drive is provided as a lifting drive for the sliding pipe 27, which chain drive is provided with endless drive chains 50 which run over drive and guide pulleys 48 and 49 and which are mounted on the stand pipe 30 vertically one above the other. At its lower end, the sliding pipe 27 has radial connecting members 51 with which it is connected at 52 to the vertically rotating chains 50 which are arranged on diametrically opposite sides of the sliding pipe. The sliding pipe 27 can be controlled in its lifting movements by means of the chain drives 48, 49 and 50 in the same manner as by means of the lifting cylinders 36 described above. It is also possible to design the chain drives simply as braking devices which, like the abovementioned shock absorbers, hold the sliding pipe 27 against sudden downwards slipping. As further shown in FIGS. 4 and 5, guide rods 53 for the rotationally locked guidance are provided beneath the silo base 10, which guide rods 53 are arranged inside the stand pipe 30, here box-shaped, and on which the sliding pipe 27, with guide grooves 54 or the like arranged on its lower flange 39, is guided such that it is prevented from rotating about its pipe axis.

Figure 6:
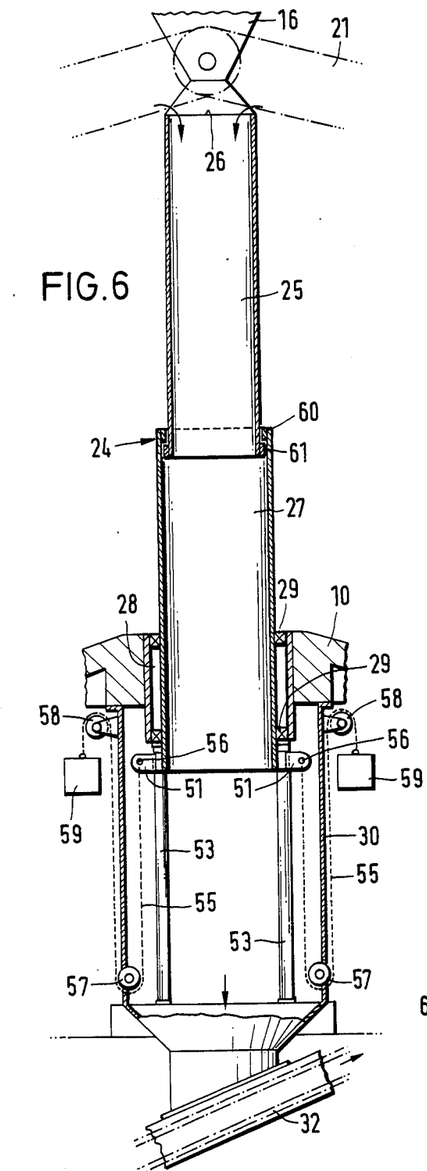

FIG. 6 shows a further exemplary embodiment of a telescopic fall pipe 24 which can be used in particular in the silo according to FIG. 1 and which differs from the exemplary embodiment according to FIG. 4 in that here the chain drive is replaced by a lifting drive which acts only in the lowering direction of the sliding pipe 27 and is in the form of a weighted rope drive. The latter comprises several, for example, two, ropes or the like 55 which are arranged beneath the silo base 10 and which, with one of their ends, are fastened at 56 to connecting members 51 at the lower end of the sliding pipe 27, run downwards from here to a guide pulley 57 on which they are returned in the opposite direction and are guided upwards to a further guide pulley 58, bearing on their other, outer ends a drive weight 59. The guide pulleys 57 and 58 are mounted on the stand pipe 30 which, in the area of the lower guide pulleys 57, is provided with through openings for the ropes 55. As is apparent, the rope tackle is designed such that it pulls the sliding pipe 27 downwards. Moreover, the weights 59 are adapted in such a way to the bulk material stored in the silo that in each case they pull sliding pipe 27 downwards, while overcoming the adhesive force at the surrounding bulk material, when the clearing device 4 lowers in the silo. This ensures that, during the lowering movement of the clearing device, the sliding pipe 27 cannot at first become stuck and then suddenly fall down after a more or less large retraction displacement of the upper coupling pipe 25. In order to pull the sliding pipe 27 upwards during the upwards movement against the force exerted by the rope tackle, the pipes 25 and 27 are provided with appropriate flanges 60 and 61 at their ends facing one another, so that the sliding pipe 27 is carried along by the upwardly moving clearing device 4 as soon as the coupling pipe 25 has extended out of the sliding pipe 27 up to the flange stop 60 and 61.

Figure 7:
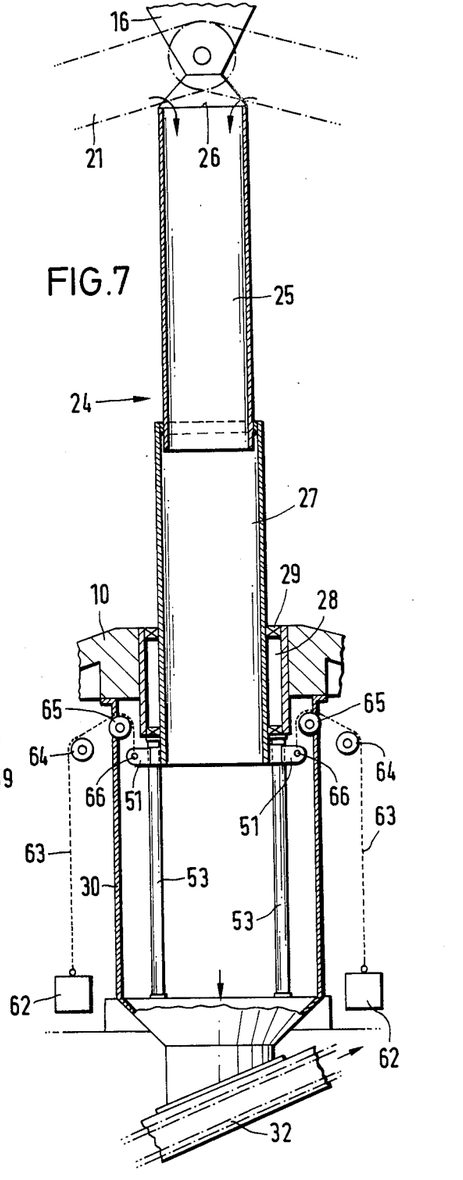

Whereas in the exemplary embodiment according to FIG. 6 the rope tackle effects automatic retraction for the sliding pipe 27, FIG. 7 shows an embodiment in which the rope tackle provided with the weights 62 acts in the extension direction of the sliding pipe 27. Here, the weights 62 are counterbalance weights which counterbalance the dead weight of the sliding pipe 27. The counter-balance weights 62 are connected at 66 to the connecting members 51 of the sliding pipe 27 via ropes or the like 63 and guide pulleys 64 and 65, with it being possible here, too, for the guide pulleys 64 and 65 to be mounted on the stand pipe 30 which encloses the sliding pipe 27 and also the guide supports 53 used for guiding and rotationally securing it. The rope tackle 62 to 66 pulls the sliding pipe 27 into its upper position and holds it in this position when, during the emptying work, the coupling pipe 25, with the lowering clearing device 4, first of all pushes into the sliding pipe 27. When the coupling pipe is fully retracted, the sliding pipe 27 is then retracted against the action of the rope tackle by the lowering clearing device 4.

Figure 8:
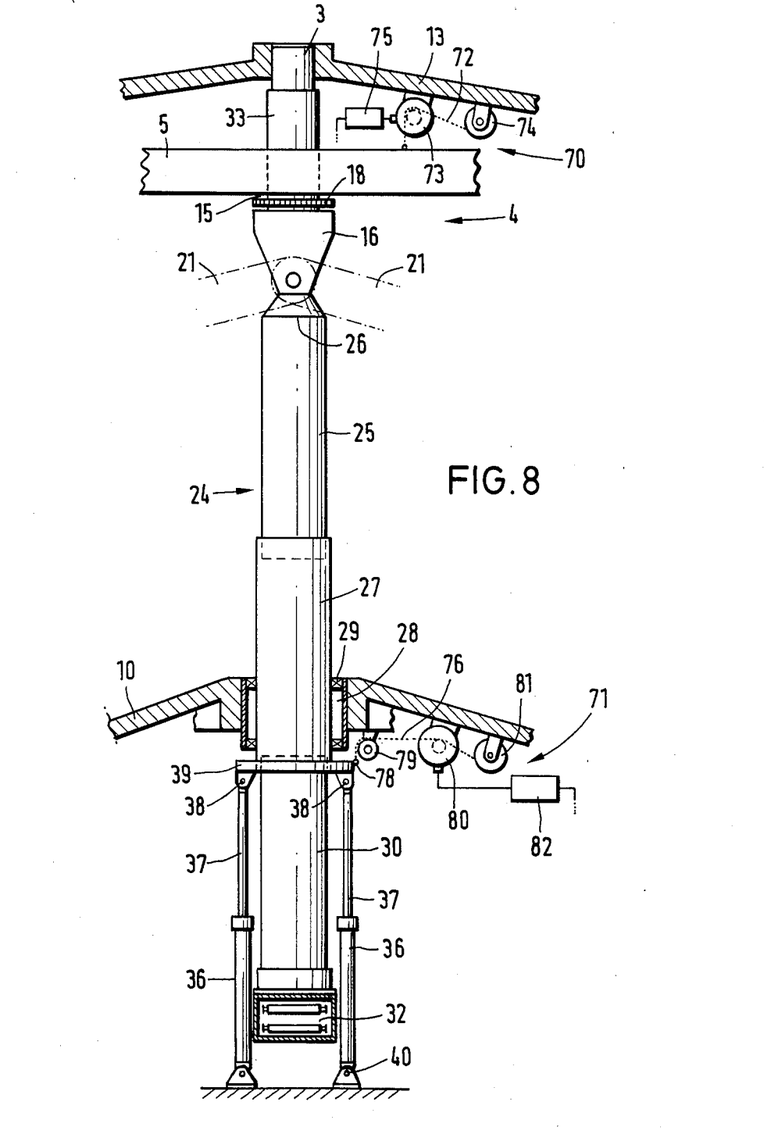

FIG. 8 shows an arrangement of the control of the lifting cylinders 36 as a function of the lifting movement of the clearing device 4, which arrangement is comparable to the exemplary embodiment according to FIG. 1. For this purpose, provision is made for a displacement-measuring device 70 which determines the lifting displacement or the respective lifting position of the clearing device 4, and also for a measuring device 71 which determines the lift or the respective extended position of the cylinders 36. The measuring device 70 can consist of a simple displacementmeasuring unit having a measuring cable 72 which is connected, for example, to the lifting frame 5, is guided around a measuring pulley 73 and can be unwound from a pulley 74, with the measuring pulley 73 supplying measuring signals to a receiver 75 as a function of the lifting movement of the lifting frame 5. The lower measuring device 71 can likewise consist of a simple displacement-measuring unit or counter having a measuring cable 76 which is connected at 78 to the flange 39 of the sliding pipe 27, is guided outwards via pulleys 79 and 80 and can be unwound from a pulley 81, with the measuring pulley 80 supplying measuring signals to a measuring or counting device 82 as a function of the lifting movements of the sliding pipe 27. The measuring signals of the measuring device 75 and 82 are compared in known manner or are converted in such a way into control signals controlling the lifting cylinders 36 that the lifting cylinders, in the manner of a sequential or synchronous control, are matched in their lifting movements to the lifting movements of the clearing device 4. Sequential or synchronous controls are known in technology in various embodiments.

The annular gaps between the various pipes of the telescopic fall pipe can of course be sealed by peripheral seals arranged on the pipe ends. Such seals are indicated in the drawing.

We claim:

1. An apparatus for emptying bulk material from a silo, said bulk material having an upper surface, said apparatus comprising:
   a silo base defining a bulk material storage chamber above said base and a lower area below said base, said base having an opening therethrough;

a clearing device for removing bulk material from said upper surface, said clearing device including means for selectively moving said device in vertical directions within said silo as said upper surface of said bulk material changes vertically within said silo;

a material receiving pipe extending vertically within said silo and adapted to convey said bulk material downwardly from said upper surface through said base to said lower area, said pipe comprising at least three hollow telescopic pipe sections including an upper section having an inlet means associated with said clearing device for receiving material from said clearing device into said pipe, a standpipe section arranged in said lower area, and a sliding section extending through said base;

means for connecting said upper section of said pipe to said clearing device, said connecting means causing said upper pipe section to generally follow the vertical movement of said clearing device;

means for removing said bulk material from said pipe at said lower area; and mechanical means in said lower area for exerting a vertical force on said sliding section of said pipe.

2. The apparatus of claim 1 wherein said mechanical means comprises a shock absorbing device for damping the downward movement of said sliding pipe section.

3. The apparatus of claim 2 wherein said shock absorbing device comprises several shock absorbers distributed around the periphery of said sliding pipe section.

4. The apparatus of claim 1 wherein said mechanical means is a retaining device comprising a braking means for braking the downward movement of said sliding pipe section.

5. The apparatus of claim 4 wherein said mechanical means comprises a rope brake.

6. The apparatus of claim 1 wherein said mechanical means is a retaining device comprising at least one counterbalance weight acting in the extension direction of said sliding pipe section.

7. The apparatus of claim 6 wherein several counterbalance weights are positioned over the periphery of said sliding pipe section, said counterbalance weights being connected to rope means guided over guide pulleys and connected to the lower end of said sliding pipe section.

8. The apparatus of claim 1 wherein said mechanical means is an automatic-retraction device comprising a lifting drive connected to said sliding pipe section and adapted to control vertical movement of said sliding pipe section against the force of gravity.

9. The apparatus of claim 8 wherein said sliding pipe section can be driven both upward and downward by means of said lifting device.

10. The apparatus of claim 8 wherein said lifting drive comprises at least one lifting unit which can be linearly retracted and extended.

11. The apparatus of claim 9 wherein said lifting drive comprises at least one lifting unit which can be linearly retracted and extended.

12. The apparatus of claim 10 wherein said lifting unit comprises a pressurized lifting cylinder.

13. The apparatus of claim 10 wherein said lifting unit comprises a positioning unit having a spindle.

14. The apparatus of claim 8 wherein said lifting drive comprises at least one chain drive.

15. The apparatus of claim 9 wherein said lifting drive comprises at least one chain drive.

16. The apparatus of claim 8 wherein said lifting drive is a rope drive.

17. The apparatus of claim 9 wherein said lifting drive is a rope drive.

18. The apparatus of claim 8 wherein said lifting drive comprises at least one weighted rope tackle.

19. The apparatus of claim 1 wherein several sliding pipe sections are provided, each said section being associated with a retaining device.

20. The apparatus of claim 1 wherein several sliding pipe sections are provided, each said section being associated with an automatic-retraction device, said automatic retraction devices each being adapted to control vertical movement of said associated pipe sections against the force of gravity.

21. The apparatus of claim 1 wherein said mechanical means comprises a retaining device arranged in said lower area and adapted to retain said sliding pipe against a free fall under the force of gravity.

22. The apparatus of claim 1 wherein said mechanical means comprises an automatic-retraction device arranged in said lower area and being adapted to control vertical movement of said sliding pipe section against the force of gravity.

23. The apparatus of claim 1 wherein said stand pipe section comprises bellows which are connected to the lower end of said sliding pipe section.

24. The apparatus of claim 1 wherein said stand pipe section has a larger diameter than said sliding pipe section.

25. The apparatus of claim 1 wherein said sliding pipe section has a diameter larger than said stand pipe section, said sliding pipe section being provided at its lower end with a means for engagement with said mechanical means.

26. The apparatus of claim 25 wherein said means for engagement with said mechanical means comprises a bracket attached to the lower end of said sliding pipe section.

27. The apparatus of claim 25 wherein said means for engagement with said mechanical means comprises a radial flange at the lower end of said sliding pipe section.

28. The apparatus of claim 1 wherein said base is conical and has an upper conical surface with an included angle and a central opening therethrough, said apparatus including means for reciprocally mounting said sliding pipe section through said opening in said silo base and a means for slidably sealing said sliding section within said opening; said clearing device comprising at least one clearing arm pivotal about an axis of said silo and means for adjusting the angle of said at least one clearing arm relative to said axis so as to correspond with said included angle of said conical base.

29. The apparatus of claim 28 wherein said clearing device comprises a scraper.

30. The apparatus of claim 28 wherein said clearing device is mounted in a vertically pivotal manner on a driven rotary member to which said coupling means of said telescopic material collecting pipe is connected, and which is mounted on a lifting frame, said silo including at least one guide means for vertically guiding said lifting frame within said silo, said lifting frame being vertically guidable in relation to said guide means.

31. The apparatus according to claim 1 including a control means for controlling the working movement of said sliding pipe section as a function of the lifting movement of said clearing device.

32. The apparatus according to claim 1 wherein a means for rotationally locking and guiding the vertical movement of said sliding pipe section is arranged generally in said lower area beneath said silo base.

* * * * *

UNITED STATES PATENT AND TRADEMARK OFFICE
CERTIFICATE OF CORRECTION

PATENT NO. : 4,773,808
DATED : September 27, 1988
INVENTOR(S) : Gerhard Fischer, Günter Strocker It is certified that error appears in the above-identified patent and that said Letters Patent is hereby corrected as shown below:

Title Page, Item [73] Assignee: "Gustave Schade Maschinenfabrik GmbH & Co.," should read --- Schade Fordertechnik GmbH & Co., ----

Signed and Sealed this

Thirtieth Day of May, 1989

Attest:

DONALD J. QUIGG

Attesting Officer

Commissioner of Patents and Trademarks